(12) United States Patent
Goedde

(10) Patent No.: US 7,114,661 B2
(45) Date of Patent: Oct. 3, 2006

(54) THERMALLY ACTUATED FLUID SHUTTLE VALVE

(76) Inventor: Michael A. Goedde, 10823 Fieldside Dr., Evansville, Vanderburgh County, IN (US) 47712

( * ) Notice: Subject to any disclaimer, the term of this patent is extended or adjusted under 35 U.S.C. 154(b) by 197 days.

(21) Appl. No.: 10/948,502

(22) Filed: Sep. 23, 2004

(65) Prior Publication Data

US 2005/0067499 A1    Mar. 31, 2005

Related U.S. Application Data

(60) Provisional application No. 60/505,975, filed on Sep. 26, 2003.

(51) Int. Cl.
*G05D 23/02* (2006.01)
*G05D 23/12* (2006.01)
*F16K 35/06* (2006.01)

(52) U.S. Cl. .................. 236/93 R; 236/93 A; 236/99 S; 236/99 K; 137/468; 251/337

(58) Field of Classification Search .............. 236/93 R, 236/93 A, 99 J, 99 F, 99 K; 137/468; 251/337
See application file for complete search history.

(56) References Cited

U.S. PATENT DOCUMENTS

| 3,841,551 | A | * | 10/1974 | Ota ............................ 236/86 |
| 4,175,697 | A | * | 11/1979 | Dreibelbis ................ 236/93 A |
| 4,335,690 | A | * | 6/1982 | Hosokawa et al. ...... 123/406.7 |
| 6,024,290 | A | * | 2/2000 | Dosani et al. ........... 236/12.12 |
| 6,929,187 | B1 | * | 8/2005 | Kempf et al. ............ 236/12.11 |

* cited by examiner

*Primary Examiner*—Marc Norman
(74) *Attorney, Agent, or Firm*—Gary K. Price, Esq.

(57) ABSTRACT

A thermally actuated fluid shuttle valve that is a three-way direction control valve that shifts when fluid passing through said valve reaches a preset temperature. The control valve, including three ports, an internal shiftable spool, and a thermal element, wherein fluid entering a first port from a source of heated fluid passes around a thermal element and out of a second port, until the fluid is warm enough to cause the thermal element to expand, thereby shifting said spool so that the first port is closed, and the second and third ports are in fluid communication with each other.

19 Claims, 3 Drawing Sheets

THERMALLY ACTUATED FLUID SHUTTLE VALVE

CROSS REFERENCES TO RELATED APPLICATIONS

U.S. Provisional Application for Patent No. 60/505,975, filed Sep. 26, 2003, with title "Thermally Actuated Fluid Shuttle Valve" which is hereby incorporated by reference. Applicant claims priority pursuant to 35 U.S.C. Par. 119(e) (i).

Statement as to Rights to Inventions Made Under Federally Sponsored Research and Development Not Applicable

BACKGROUND OF THE INVENTION

1. Field of the Invention

The present invention relates generally to a thermally actuated fluid shuttle valve that is a three-way direction control valve that shifts when fluid passing through the valve reaches a preset temperature. Fluid entering a first port from a first source where the fluid is being heated, passes around a thermal element and out of a second port, until such time as the fluid reaches a preset temperature then, the valve shifts internally and the first port is blocked while the second and a third port are in fluid communication with each other and with a second fluid source.

In the preferred embodiment of the present invention, the valve is useful in conjunction with a hot water line to a warm water outlet is a sufficient distance from a source of heat, so that instead of just running the water until the water is warm enough for use, the water can be diverted to a useful outlet.

2. Brief Description of Prior Art

In fluid distribution systems, where it is desirable to pass warm or hot fluid through an outlet, and where it takes some time to reach a desired temperature, often the fluid is not warm enough, so a user or operator drains the fluid until sufficiently warm or hot fluid has reached the outlet. In water systems, such as in washing operations, the fluid that is not warm enough goes down a drain. This wastes water and entails treatment and sewage handling expenses. In fluid power systems, it often wastes horsepower and energy.

U.S. Pat. No. 5,165,456 discloses a manual diverter valve, manually operable by a user to allow storage of cold water from the hot water line in an auxiliary tank. While such an arrangement can save water, it has limitations based on the manual operation. Such an arrangement relies on the individual operator to initiate the savings of water. This is not convenient and may not be reliable depending upon the number of potential users.

U.S. Pat. No. 4,554,688 discloses an automatic method of purging a hot water line. But this complex arrangement uses pumps and solenoid powered valves that will be expensive to install and maintain.

As will be seen from the subsequent description, the preferred embodiments of the present invention overcome these and other shortcomings of existing fluid technology.

SUMMARY OF THE INVENTION

The present invention is directed to a thermally actuated fluid shuttle valve for homes and other building structures where it is desirable to pass warm or hot fluid through an outlet. The thermally actuated fluid shuttle valve is a three-way directional control valve that shifts when a fluid passing through said valve reaches a preset temperature. The valve including three ports, an internal shiftable spool, and a thermal element, wherein fluid entering a first port from a source of heated fluid passes around the thermal element and out of a second port, until the fluid is warm enough to cause the thermal element to expand, thereby shifting said spool so that the first port is closed, and the second and third ports are in communication with each other.

DESCRIPTION OF THE PREFERRED EMBODIMENT

Figure 1:
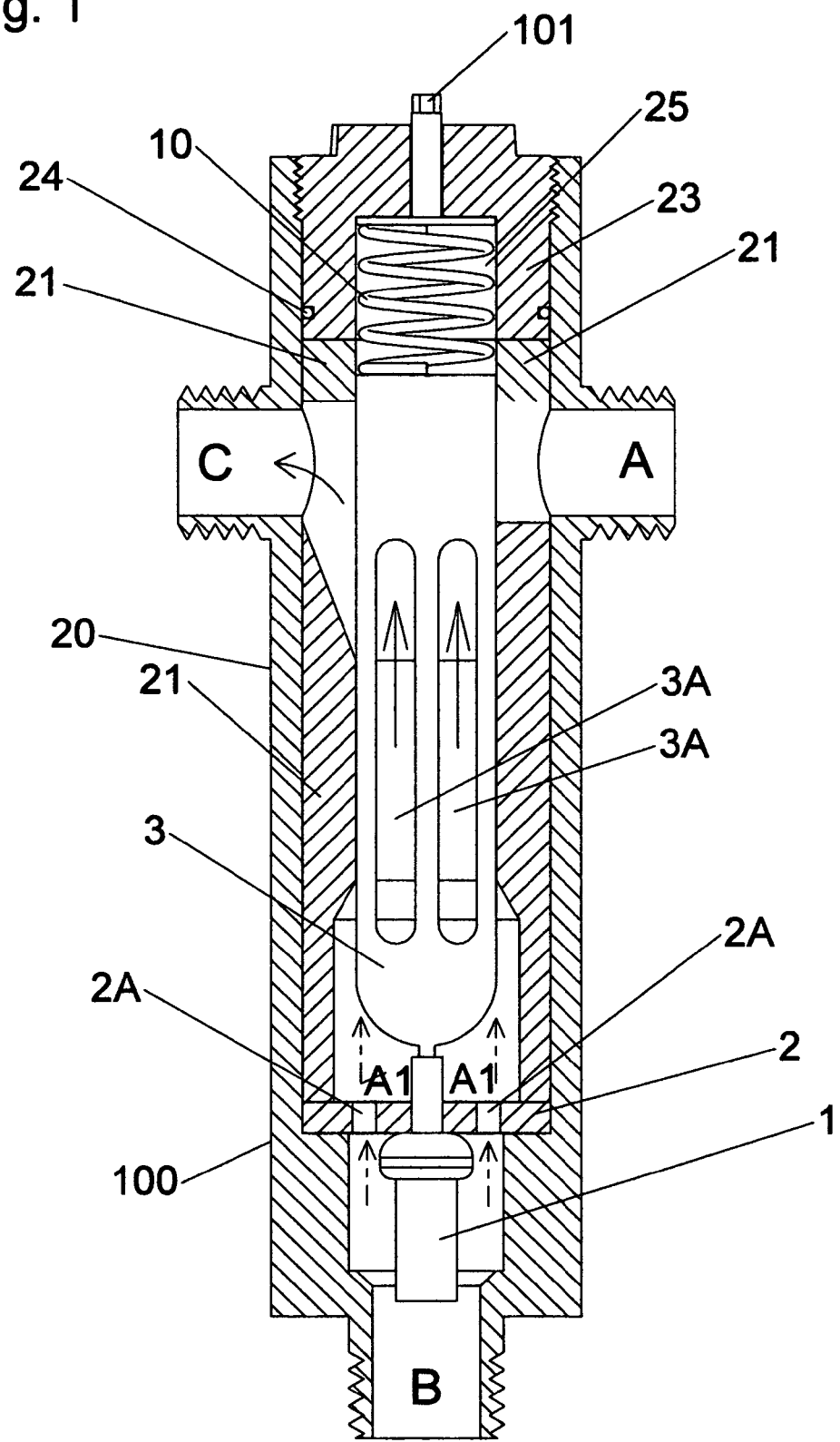
FIG. 1 is a cross section plan view of the preferred embodiment of the present invention, a thermally actuated three way shuttle valve, in a closed position.

In accordance with the present invention, a thermally actuated fluid shuttle valve of the type useful in conjunction with a hot water line found in homes and other building structures is disclosed. The thermally actuated fluid shuttle valve generally being a three-way direction control valve that shifts when fluid passing through the valve reaches a preset temperature. Specifically, it will be noted in the drawings that the thermally actuated fluid shuttle valve relates to an apparatus designed to avoid water waste. In the broadest context, the thermally actuated fluid shuttle valve of the present invention consists of components configured and correlated with respect to each other so as to attain the desired objective.

Figure 2:
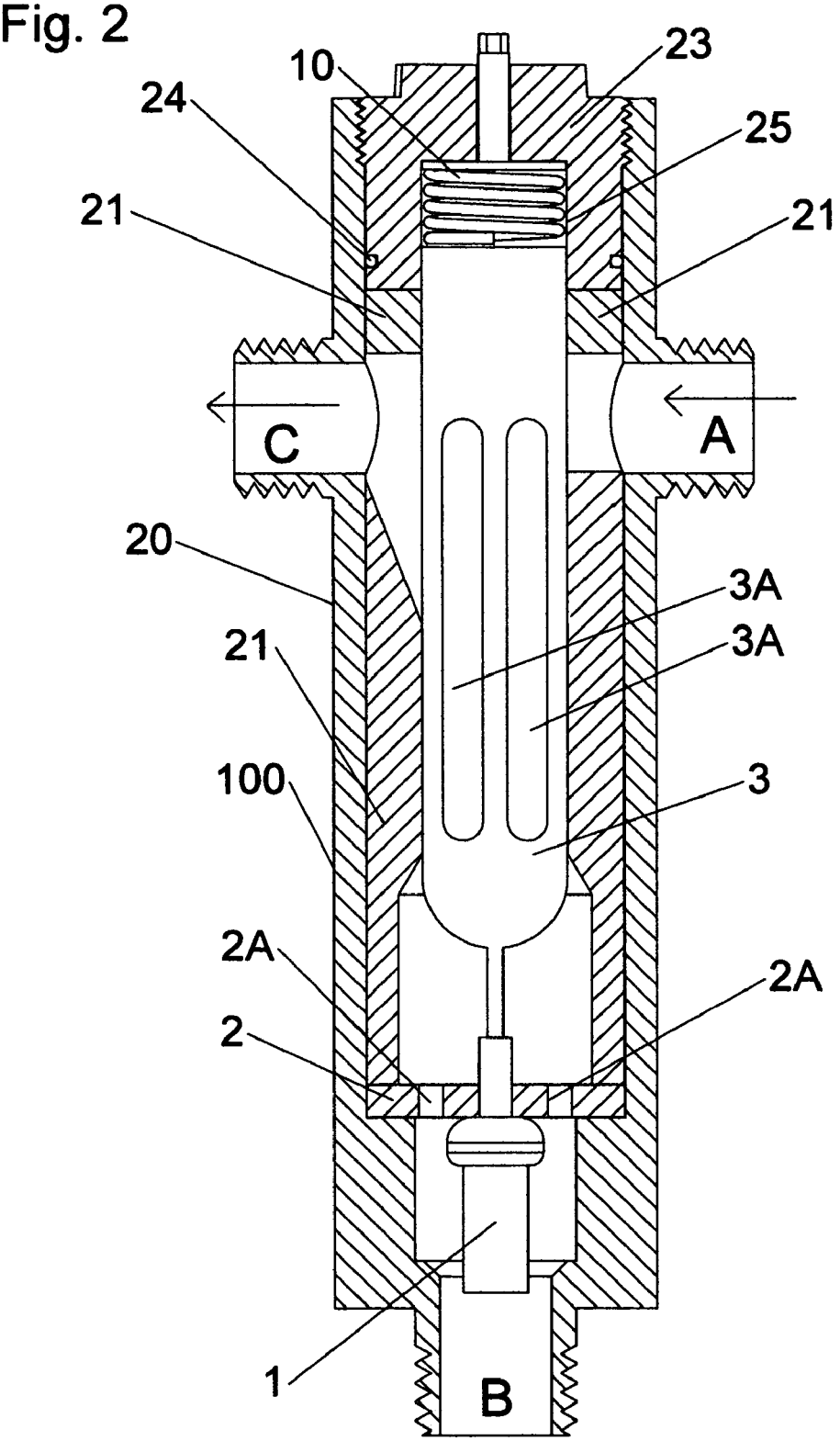
FIG. 2 is a valve of FIG. 1 in an open position.
Figure 3:
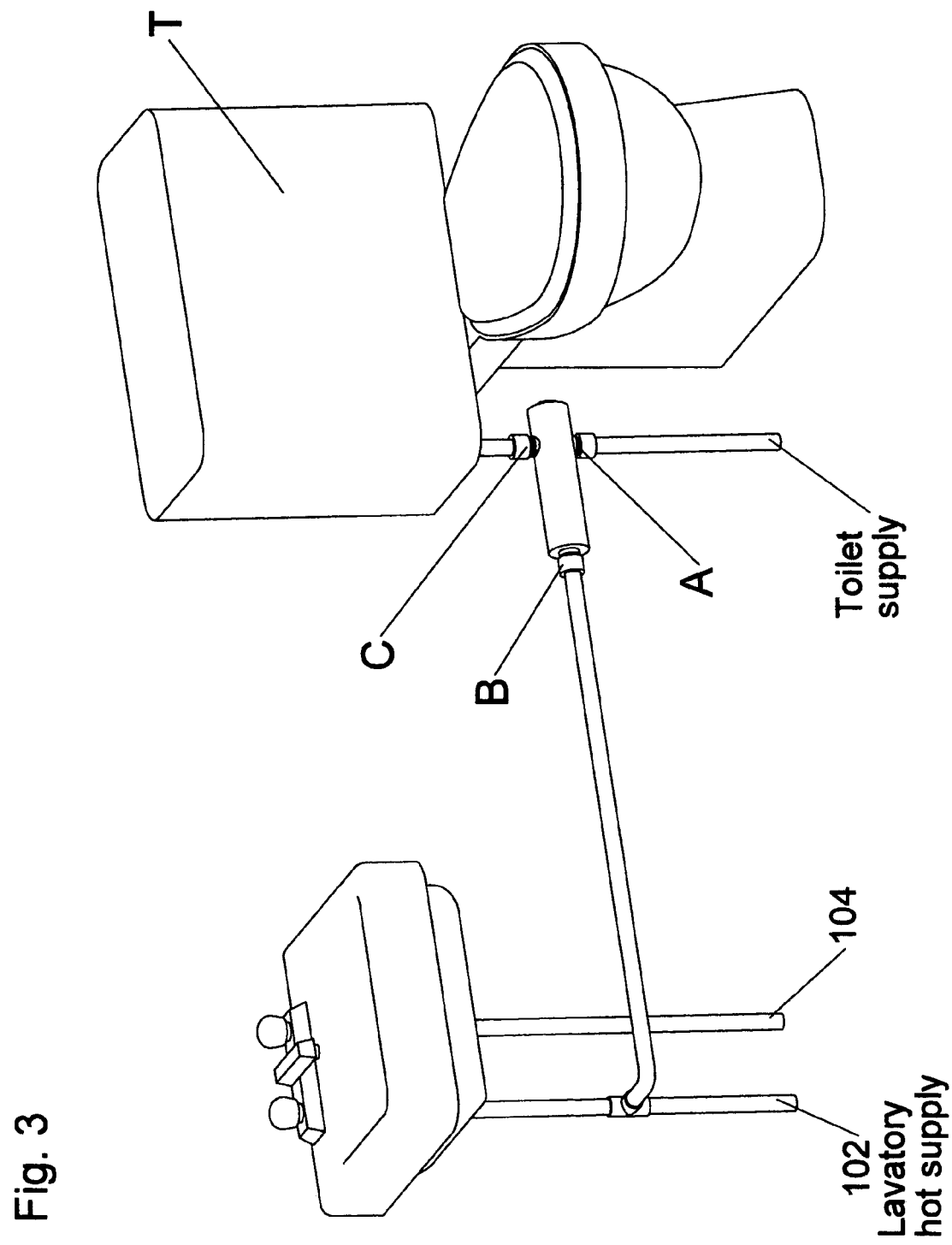
FIG. 3 is an application sketch applying the valve of FIGS. 1 and 2.

FIGS. 1–3 illustrate a preferred embodiment of the thermally actuated fluid shuttle valve 100 made in accordance of the present invention. Referring to FIGS. 1 and 2, the valve 100 includes a valve body 20, a thermal actuator 1, an actuator positioner 2 with flow clearances 2A, a valve spool 3, with clearances 3A, a spring 10, a fixed sleeve 21, a plug 23 with a spring clearance 25, a plug seal 24, and ports A, B and C. Arrows indicate direction of fluid (not shown) flow within the valve 100.

As shown in the drawings, the thermal actuator 1 is preferably disposed between the flow clearances 2A of the actuator positioner 2, and affixed to the actuator positioner 2. The actuator positioner 2 is held butted up against the valve body 20 by the fixed sleeve 21. Thermal actuator 1 can be an automatic device such as a bimetal device which relies on an unequal expansion of metals to provide a movement, or a shape memory device that relies on a material that changes to assume a given shape at a given temperature, or the device could be based upon a material that expands with temperature such as a gas or metal. The thermal actuator 1 does not require an external source of power, rather the movement of the thermal actuator is powered by the hot water flowing through the valve body 20. Any thermal actuator 1 can react automatically upon exposure to water of a given temperature.

The valve spool 3 slides within the fixed sleeve 21 and the end plug 23.

Referring to FIG. 1, in application, fluid will flow through port B, through the flow clearances 2A of the actuator positioner 2, through the clearances 3A of the valve spool 3, and out through port C.

The spring 10 is preferably disposed opposite the thermal actuator 1. As will be discussed, the spring 10 biases the valve spool 3 against the thermal actuator 1.

As the fluid flowing through part B warms, the thermal actuator 1 moves the valve spool 3 in the direction indicated in FIG. 1 by arrow "A1", thereby closing off flow from port B to port C, while opening flow from port A to port C, as shown in FIG. 1.

As the fluid cools, the thermal actuator 1 contracts, and the valve spool 3, which is held against the thermal actuator 1 by the spring 10, moves back toward its original position, again permitting fluid to flow from port B to port C.

FIG. 3 represents a typical application for the valve 100. As shown in FIG. 3, a hot water supply is connected to port B, the cold water supply is connected to port A, and port C is connected to a line leading directly to the toilet tank inlet. If the heat source for the hot water supply 102 is some distance away, initial water temperature is not comfortable for bathing and showering. As a result, application of the present invention causes the cooler water to flow from port B (the hot water line) to port C (to the tank T, such as a toilet tank). Once the fluid reaches a preset temperature and is sufficiently warm, the thermal actuator 1 expands, as indicated in FIG. 2, and the valve spool 3 shifts to the position indicated in FIG. 2, shutting off the now hot water, and permitting the regular toilet supply line water to flow from port A to port C as required. As a result, the cooler water not comfortable for bathing or showering is not wasted but instead directed to the toilet tank T inlet for use. The temperature at which the valve spool moves can be preset by the design of the components such as the spring 10 and thermal actuator 1. Though not required, an adjustment device 101 can be provided to allow the installer or end user to adjust the temperature at which the spool 3 will move.

Although the description above contains many specificities, these should not be construed as limiting the scope of the invention but as merely providing illustrations of some of the presently preferred embodiments of this invention. For example, another application for the present invention would be for a hospital to cross connect a cooling tower water supply line with the hot water supply to its laundry and eliminate a hot water recirculating line. As such, it is to be understood that the present invention is not limited to the embodiments described above but encompasses any and all embodiments within the scope of the claims.

It will be obvious to those skilled in the art that modifications may be made to the embodiments described above without departing from the scope of the invention. For example, though the device is shown filling a toilet tank it will be understood that the tank could be for any use such as lawn irrigation, further it will be understood that the water could be diverted for any use. Thus the scope of the invention should be determined by the claims in the formal application and their legal equivalents, rather than by the examples given.

I claim:

1. A three-way direction control valve that shifts when a fluid passing through said valve reaches a preset temperature, said control valve comprising:
   a first port, a second port, and a third port,
   an internal shiftable spool,
   a thermal actuator, and
   a spring biasing the internal shiftable spool against the thermal actuator,
   wherein fluid entering the first port from a first fluid source passes through the thermal actuator and out of the second port until the fluid is warm enough to cause the thermal actuator to expand, shifting said spool so that both the fluid flow from the first source is stopped at the first port, and the second port is now in communication with the third port, so that a second fluid source may flow through the second and third ports,
   wherein the second and third ports are in fluid communication with a portion of a fluid circuit accepting fluid from the second source, and
   wherein when the warm fluid cools, the spring keeps the valve spool biased against the thermal actuator so the valve spool moves back toward its original position, permitting fluid to again flow from the first port to the second port.

2. The valve as recited in claim 1, wherein said thermal actuator is contained within the valve.

3. The valve as recited in claim 1, wherein the movement of the thermal actuator is powered by fluid temperature.

4. The valve as recited in claim 1, wherein said first fluid source is a hot water heater.

5. The valve as recited in claim 1, wherein said third port supplies a tank.

6. A valve that automatically shifts when a fluid passing through said valve reaches a preset temperature, said valve comprising:
   a first port, a second port, and a third port,
   an internal shiftable spool,
   a thermal actuator, and
   said internal shiftable spool having a first position wherein fluid entering the first port from a first fluid source passes through the thermal actuator and out of the second port and said internal shiftable spool having a second position wherein fluid flows from the third port to said second port, the internal shiftable spool having the second position when the fluid is warm enough to cause the thermal actuator to shift wherein when the fluid cools, the internal shiftable spool moves back to said first position.

7. The valve as recited in claim 6, wherein said internal shiftable spool is spring biased to said first position.

8. The valve as recited in claim 7, wherein said thermal actuator is powered by water temperature.

9. The valve as recited in claim 7, wherein said internal shiftable spool and said thermal actuator are connected within the fluid flow of a valve body of said valve.

10. The valve as recited in claim 7, wherein said first port is connected to a hot water heater, said third port is connected to a cold water line and said second port is connected to a tank.

11. The valve as recited in claim 10, wherein said tank is a toilet tank.

12. A valve that automatically shifts when a fluid passing through said valve reaches a preset temperature, said valve comprising:
   a first port, an internal shiftable spool,
   a thermal actuator, and
   said internal shiftable spool having a first position wherein fluid entering the first port from a first fluid source passes through the thermal actuator and out, and said internal shiftable spool having a second position wherein fluid flow from the first port is blocked, the internal shiftable spool having the second position wherein the fluid is warm enough to cause the thermal actuator to shift, wherein when the fluid cools the internal shiftable spool moves back to said first position.

13. The valve as recited in claim 12, wherein said internal shiftable spool is spring biased to said first position.

14. The valve as recited in claim 13, wherein said thermal actuator is powered by water temperature.

15. The valve as recited in claim 14, wherein said first port is connected to a hot water heater.

16. The valve as recited in claim 15, wherein said internal shiftable spool and said thermal actuator are contained within the fluid flow of a valve body of said valve.

17. The valve as recited in claim 16, further including a second port and a third port wherein water can flow from said third port to said second port when said internal shiftable spool is in said second position thereof.

18. The valve as recited in claim 17, wherein fluid flows from said first port to said second port when said internal shiftable spool is in said first position thereof.

19. The valve as recited in claim 18, wherein said second port is connected to a supply line for a toilet tank.

* * * * *